United States Patent
Jang (10) Patent No.: US 10,924,985 B2
(45) Date of Patent: Feb. 16, 2021

(54) DOWNLINK BASE STATION SELECTION MECHANISM BASED ON DOWNLINK SIGNAL QUALITY

(71) Applicant: SK Telecom Co., Ltd., Seoul (KR)

(72) Inventor: Jae Seong Jang, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 11 days.

(21) Appl. No.: 16/428,774

(22) Filed: May 31, 2019

(65) Prior Publication Data

US 2019/0289538 A1 Sep. 19, 2019

Related U.S. Application Data

(63) Continuation-in-part of application No. PCT/KR2018/009856, filed on Aug. 27, 2018.

(30) Foreign Application Priority Data

Aug. 30, 2017 (KR) .................. 10-2017-0110050

(51) Int. Cl.
*H04W 48/16* (2009.01)
*H04B 17/309* (2015.01)
*H04W 24/08* (2009.01)
*H04W 24/10* (2009.01)
*H04W 88/08* (2009.01)
*H04W 24/02* (2009.01)

(52) U.S. Cl.
CPC .......... *H04W 48/16* (2013.01); *H04B 17/309* (2015.01); *H04W 24/02* (2013.01); *H04W 24/08* (2013.01); *H04W 24/10* (2013.01); *H04W 88/08* (2013.01)

(58) Field of Classification Search
CPC ..... H04W 48/16; H04W 24/02; H04W 24/08; H04W 24/10; H04W 88/08; H04B 17/309
See application file for complete search history.

(56) References Cited

U.S. PATENT DOCUMENTS

| | | | |
|---|---|---|---|
| 7,519,366 B2* | 4/2009 | Guo ...................... | H04W 16/28 455/435.2 |
| 7,664,119 B2* | 2/2010 | Adams .................. | H04L 47/724 370/400 |
| 7,929,971 B2 | 4/2011 | Lucidarme et al. | |
| 2009/0286563 A1* | 11/2009 | Ji .......................... | H04W 48/20 455/501 |

FOREIGN PATENT DOCUMENTS

| | | |
|---|---|---|
| KR | 10-0714530 B1 | 5/2007 |
| KR | 10-2011-0058420 A | 6/2011 |
| KR | 10-1607854 B1 | 3/2016 |
| KR | 10-1679798 B1 | 11/2016 |

OTHER PUBLICATIONS

PCT International Search Report and Written Opinion, PCT Application No. PCT/KR2018/009856, dated Nov. 29, 2018, 2 pages.

* cited by examiner

*Primary Examiner* — Wei Zhao
(74) *Attorney, Agent, or Firm* — Fenwick & West LLP

(57) ABSTRACT

Provided is a technology that increases a downlink packet reception success rate and improves the quality of IoT service by implementing an improved downlink base station selection scheme that takes into consideration a difference in designed downlink signal transmission strength between base stations when selecting a downlink base station for a terminal.

20 Claims, 5 Drawing Sheets

DOWNLINK BASE STATION SELECTION MECHANISM BASED ON DOWNLINK SIGNAL QUALITY

CROSS-REFERENCE TO RELATED APPLICATIONS

This is a continuation-in-part of International Application No. PCT/KR2018/009856 filed on Aug. 27, 2018, which claims priority to Republic of Korea Patent Application No. 10-2017-0110050 filed on Aug. 30, 2017, which are incorporated by reference herein in their entirety

BACKGROUND OF THE INVENTION

1. Field of the Invention

The present disclosure relates to Internet of Things (IoT) technology. Particularly, the present disclosure relates to improving selecting of a downlink base station for an IoT terminal to increase a downlink packet reception success rate.

2. Description of the Prior Art

Recently, Internet of Things (IoT) technology has emerged and received attention. IoT technology enables connecting of objects in everyday life via a wired or wireless network and sharing of information in various fields such as healthcare, telemetering, smart homes, smart cars and smart farms.

An IoT network structure for providing an IoT service based on the IoT technology will be briefly described below. The IoT network includes an IoT terminal that periodically transmits data, a customer terminal that installed with an application for IoT (hereinafter, referred to as an IoT app) to identify data of the IoT terminal and to control the IoT terminal, a network device (or an IoT app server) that connects the IoT terminal and the customer terminal (IoT app) via a wired/wireless network, and a gateway (e.g., an IoT base station) that transmits/receives packets between the IoT terminal and the network device.

The quality of IoT service provided in the IoT network structure may be significantly affected by a reception success rate associated with an uplink packet/downlink packet that is transmitted between three nodes: an IoT terminal, an IoT base station, and a network device.

When uplinking, an IoT terminal transmits uplink packets to the network device. During uplinking, the IoT terminal transmits uplink packets to the network device in a broadcast manner. That is, two or more IoT base stations may receive the uplink packets and relay them to the same network device. Because two or more IoT base stations instead of a single IoT base station relay the uplink packets, an uplink packet reception success rate is generally higher than a downlink packet reception success rate.

Conversely, when downlinking, a network device transmits downlink packets to the IoT terminal. For downlinking, a downlink base station is preselected for the IoT terminal, and the network device transmits a downlink packet to the IoT terminal via the preselected downlink base station. The downlink packet is transmitted via a single downlink base station, and thus, a downlink packet reception success rate is largely determined by the selected downlink base station.

According to a conventional method of selecting a downlink base station for an IoT terminal, the IoT base station having the best uplink signal quality value associated with the IoT terminal is selected among two or more IoT base stations that relay the uplink packets from the IoT terminal to the network device. That is, the conventional method selects the downlink base station based only on an uplink signal quality value measured by the IoT base stations with respect to an uplink signal from the IoT terminal.

When an indoor base station is installed inside a building or a subway, a downlink signal transmission strength (transmission output) is designed to be lower than that of an outdoor base station. Accordingly, when the conventional method is used to select a downlink base station, there is a drawback that an indoor base station having a higher uplink signal quality value but a lower downlink signal transmission strength relative to an outdoor base station may be selected as the downlink base station for the IoT terminal, which results in a lower downlink packet reception success rate.

However, the current IoT technology does not provide a method to address the drawback caused by the difference in downlink signal transmission strength design between base stations.

Accordingly, the present disclosure provides an improved method of selecting a downlink base station that prevents the above-described drawback that may occur due to the difference in downlink signal transmission strength design between base stations.

SUMMARY OF THE INVENTION

Embodiments relate to a base station for providing communication between a terminal and a network device. The base station includes a measurement unit, a generation unit and a controller. The measurement unit measures quality of an uplink signal received by the base station from the terminal. The generation unit generates a base station signal quality value by adjusting the measured uplink signal quality value according to a predetermined value indicating a downlink signal transmission strength of the base station. The controller includes the base station signal quality value in an uplink packet from the terminal for transmitting to the network device. The network device selects a downlink base station for the terminal among a plurality of base stations based at least on the base station signal quality value.

In one embodiment, the base station signal quality value of the base station is lower than another base station signal quality value of another base station with the same uplink signal quality value, the other base station having another downlink signal transmission strength higher than the base station.

In one embodiment, the generation unit generates the base station signal quality value by subtracting the predetermined value from the uplink signal quality value.

In one embodiment, the predetermined value is higher than another predetermined value of another base station having a downlink signal transmission strength higher than the base station.

In one embodiment, the predetermined value is a fixed value if the base station is an indoor base station, and the predetermined value is zero if the base station is an outdoor base station device having a downlink signal transmission strength higher than the indoor base station.

In one embodiment, the terminal broadcasts the uplink packet to a plurality of base stations including the base station for sending but receive downlink packets from the network device via the selected downlink base station.

In one embodiment, the terminal does not receive the downlink packets during an uplink transmission interval.

Embodiments also relate to operating a base station for providing communication between a terminal and a network device. Quality of an uplink signal received from a terminal for sending to the network device is measured by the base station. A base station signal quality value of the base station is generated by adjusting the measured uplink signal quality value by a predetermined value indicating a downlink signal transmission strength of the base station. The base station signal quality value is included in an uplink packet from the terminal for transmitting from the base station to the network device to cause the network device to select a downlink base station for the terminal among a plurality of base stations based at least on the base station signal quality value.

Embodiments also relate to a network device communicating with a terminal via base stations. The network device may include a packet reception unit, an identification unit, and a base station selection unit. The packet reception unit receives an uplink packet transmitted by a terminal via base stations. The identification unit extracts base station signal quality values from uplink packets received from the base stations. The base station signal quality value of a base station is generated by adjusting a uplink signal quality value measured at the base station according to a predetermined value indicating a downlink signal transmission strength of the base station. The base station selection unit selects one of the base stations having a highest base station signal quality value as a downlink base station for the terminal.

In one embodiment, a first base station signal quality value of a first base station is lower than a second base station signal quality value of a second base station with a same uplink signal quality value when the second base station has another downlink signal transmission strength higher than the base station.

In one embodiment, a difference between a first predetermined value for a first base station and a second predetermined value of a second base station is increased as a difference in a first downlink signal transmission strength of the first base station and a second downlink signal transmission strength of the second base station is increased.

In one embodiment, the base station selection unit is selects, as the downlink base station for the terminal, a base station with a base station signal quality value extracted first among two or more base stations having the same highest base station signal quality value.

DETAILED DESCRIPTION OF THE EXEMPLARY EMBODIMENTS

Hereinafter, embodiments of the present disclosure will be described with reference to the accompanying drawings.

Figure 1:
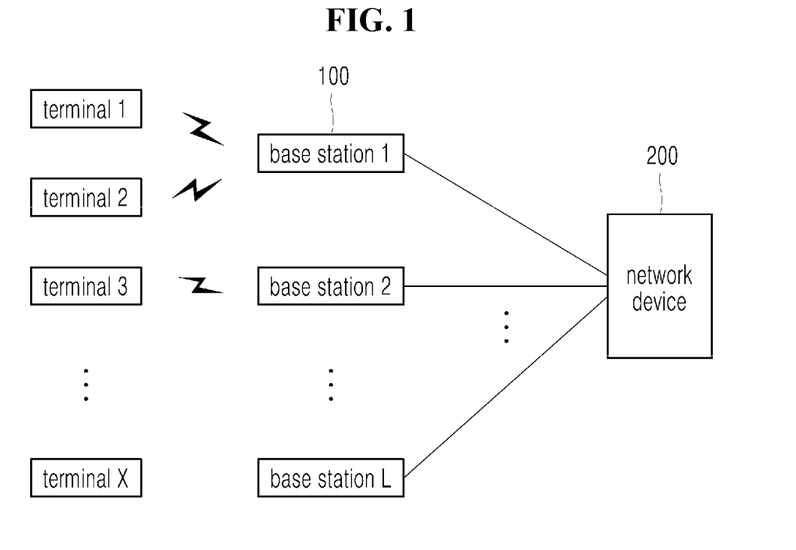
FIG. 1 illustrates an IoT network architecture to which the present disclosure is applied.

FIG. 1 illustrates the architecture of an Internet-of-Things (IoT) network to which the present disclosure is applied. As illustrated in FIG. 1, the architecture of an IoT network according to an embodiment may include: an IoT terminal (e.g., terminal 1, 2, 3, . . . , and X) that periodically transmits data; a customer terminal (not illustrated) installed with an IoT app to identify data of the IoT terminal and to control the IoT terminal; a network device 200 that connects the IoT terminal and the customer terminal (IoT app) via a wireless or wired network; and a gateway (IoT base station, for example, base stations 1, 2, . . . , and L) that transmits and receives a packet between the IoT terminal and the network device 200.

IoT terminals in the IoT technology operate according to an uplink packet transmission scheme where the IoT terminals send (transmit) data (uplink packets) via a channel that is randomly selected among a plurality of channels at predetermined uplink intervals.

The IoT terminals may be classified into several types of IoT terminals according to a downlink packet reception scheme. An IoT terminal of a conditional reception type, which is one of the types of IoT terminals, receives a response (downlink packets) to a transmitted data (the uplink packets) during a predetermined number of downlink time intervals of a predetermined unit of time, in order to conserve power.

For example, if it is assumed that a predetermined period of time is one second, a predetermined number of intervals is 2, and an interval between time intervals is one second, the IoT terminal of the conditional reception type sends (transmits) data (uplink packets) when a defined uplink transmission interval arrives. The IoT terminal may receive a downlink packet in a first downlink time interval (DL1) one second after completing uplink packet transmission. When the downlink is not received, the IoT terminal may receive a downlink packet in a second downlink time interval (DL2) one second after DL1 ends, that is, three seconds after a time point at which the uplink packet transmission is completed.

When the IoT terminal successfully receives the downlink packet in DL1 or DL2 after transmitting the uplink packet, the IoT terminal may wait in a sleep mode until a subsequent uplink transmission interval is reached when the IoT terminal can send (transmit) subsequent data (subsequent uplink packets).

When the IoT terminal fails to receive the downlink packets in both DL1 and DL2 after transmitting the uplink packet, the IoT terminal performs an uplink packet (data) retransmission process according to a determined rule, before the current uplink transmission interval elapses.

The above-described conditional reception type is mainly adopted/operated by an IoT terminal used for IoT technology (long range (LoRa)) specialized in transmission at a low speed (<1 kbps) and transmission of a small amount of data that supports low power in a wide coverage area.

During uplinking when an IoT terminal broadcasts an uplink packet to a network device, two or more IoT base stations receive the uplink packets and transmit the uplink packets to the network device.

As described above, the uplink packets are transmitted via the two or more IoT base stations, and thus, an uplink packet reception success rate is relatively higher than a downlink packet reception success rate.

Conversely, during downlink when the network device transmits a downlink packet to the IoT terminal, downlink packets are transmitted via only a single IoT base station, unlike uplinking when multiple simultaneous transmissions are performed via two or more IoT base stations.

Particularly, in the case of downlinking, when the network device preselects a downlink base station for the IoT terminal, and transmits downlink packets for the IoT terminal to the preselected downlink base station, the downlink base station transmits the downlink packets to the IoT terminal.

Therefore, a downlink packet reception success rate is significantly impacted by the downlink base station that the network device has selected for the IoT terminal.

According to the conventional method of selecting a downlink base station for an IoT terminal, an IoT base station having the best uplink signal quality value associated with an IoT terminal is selected as the downlink base station among two or more IoT base stations that transmit an uplink packet of the IoT terminal to a network device.

Referring to FIG. 1, according to the conventional method, when it is assumed that an uplink packet of terminal 2 is transmitted to the network device 200 via base stations 1 and 2, the network device 200 selects a base station having the best uplink signal quality value (uplink signal to noise ratio (UL SNR)) associated with terminal 2 from base stations 1 and 2, as the downlink base station.

That is, the conventional method selects a downlink base station based only on an uplink signal quality value (UL SNR) that an IoT base station measures with respect to an uplink signal of the IoT terminal.

In the case of an indoor base station that is installed inside a building or a subway, a downlink signal transmission strength (transmission output) is often designed to be lower than that of an outdoor base station.

Accordingly, when an indoor base station is selected as the downlink base station according to the conventional method, a downlink packet reception success rate may be drop further than cases where an outdoor base station is selected because the outdoor base station generally has an uplink signal quality value (UL SNR) lower than that of the indoor base station but has a downlink signal transmission strength higher than that of the indoor base station.

However, the current IoT technology does not provide a method of overcoming the drawback caused by the difference in downlink signal transmission strengths between base stations.

Accordingly, the present disclosure provides an improved method of selecting a downlink base station to address the above-described drawback due to the difference in downlink signal transmission strengths between base stations.

More particularly, the embodiments provide a base station device and a network device, which implement an improved downlink base station selecting scheme.

Figure 2:
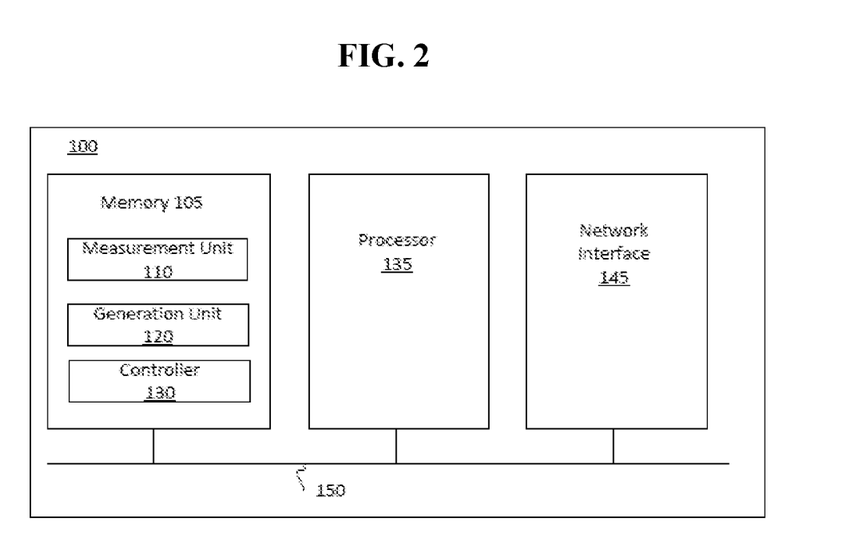
FIG. 2 is a block diagram illustrating the configuration of a base station device according to an embodiment of the present disclosure.

Hereinafter, the base station device according to an embodiment of the present disclosure will be described in detail with reference to FIG. 2. A base station device 100 according to the present disclosure may be one of the base stations 1, 2, . . . , and L illustrated as a gateway in FIG. 1, and it is assumed that the base station device 100 is base station 1 for the sake of convenience of description. Further, for ease of description, a description will be provided using terminals 1, 2, . . . , and X as the IoT terminals, and the network device 200 illustrated in FIG. 1.

The base station device 100 according to the present disclosure may function as a gateway that transmits and receives packets between the IoT terminal and the network device 200. That is, the base station device 100 may receive an uplink packet that a terminal (e.g., terminal 2) in the coverage area of the base station device 100 broadcasts, and may transmit the received uplink packet to the network device 200. Also, the base station device 100 may transmit a downlink packet received from the network device 200 to a corresponding terminal (e.g., terminal 2). Accordingly, the base station device 100 may function as a gateway that transmits and receives packets between the terminal (e.g., terminal 2) (as an IoT terminal) and the network 200.

As described above, the base station device 100 functioning as a gateway in the IoT network may include, among other components, a memory 105, a processor 135, a network interface 145 and a bus 150 connecting these components. The memory 105, the processor 135 and the network interface 145 may be embodied as hardware components such as circuitry or a combination of hardware components and software or firmware. The memory 105 stored instructions executed by the processor 135. Specifically, the memory 105 stores, among other software components, a measurement unit 110, a generation unit 120, and a controller 130 in order to perform the improved downlink base station selecting scheme of the present disclosure. The measurement unit 110, the generation unit 120 and the controller 130 may be embodied as separate circuits.

The measurement unit 110 may measure the quality of an uplink signal received from an IoT terminal. Using the same terminal 2 as an example of the IoT terminal, the measurement unit 110 may measure the quality of an uplink signal (carrying an uplink packet) during the process of receiving the uplink packet broadcasted by a terminal (e.g., terminal 2). Alternatively, the measurement unit 110 may receive an uplink signal that is separately transmitted from terminal 2 for signal quality measurement to measure the quality of the uplink signal.

The generation unit 120 may generate a base station signal quality value by applying a predetermined value related to a downlink signal transmission strength of the base station device 100 to the measured uplink signal quality value (UL SNR) (e.g., subtracting the predetermined value from the measured uplink signal quality value).

The predetermined value decreases the uplink signal quality value (UL SNR) of an IoT base station with a low downlink signal transmission strength so that the adjusted uplink signal quality value (UL SNR) of the IoT base station is lower than the uplink signal quality value (UL SNR) of another IoT base station that has a high downlink signal transmission strength. That is, the predetermined value is understood as a factor for compensating uplink signal quality values (UL SNR) of IoT base stations on the basis of their downlink signal transmission strength.

Accordingly, the predetermined value of the base station device 100 may be defined to generate a lower base station signal quality value than a predetermined value defined for the other base station that has a downlink signal transmission strength higher than that of the base station device 100, when the base station device 100 and the other base station have the same uplink signal quality value.

According to a more detailed embodiment, the generation unit 120 may generate a base station signal quality value by subtracting the predetermined value from the uplink signal quality value (UL SNR) measured by the measurement unit 110. For ease of description, the base station signal quality value is hereinafter referred to as a downlink signal to noise ratio (DL SNR). That is, the generation unit 120 may use a value obtained by subtracting the predetermined value from the uplink signal quality value (UL SNR) measured by the measurement unit 110, as the base station signal quality value (DL SNR).

In this instance, the predetermined value for the base station device 100 may be defined to be higher than a predetermined value defined in another base station that has a downlink signal transmission strength that is higher than that of the base station device 100.

When the base station device 100 of the present disclosure is an indoor base station having a lower downlink signal transmission strength (transmission output) than that of an outdoor base station, the other base station may correspond to an outdoor base station.

Hereinafter, the process in which the base station device 100 of the present disclosure, particularly, the generation unit 120, generates (calculates) a base station signal quality value (DL SNR) will be described.

According to an embodiment (hereinafter, a first embodiment), the base station device 100 of the present disclosure may be an indoor base station or an outdoor base station.

When the base station device 100 of the present disclosure is an indoor base station, the predetermined value may be defined to have a predetermined fixed value N. The generation unit 120 of the base station device 100 (the indoor base station) may generate a base station signal quality value (DL SNR) by subtracting the predetermined value N from an uplink signal quality value (UL SNR) measured by the measurement unit 110. The fixed value N for defining the predetermined value may be a numerical value obtained via a previous operation such as an experiment, simulation, or the like, performed on the basis of the difference in downlink signal transmission strength design between the indoor and outdoor base stations.

Accordingly, the predetermined value N may differ depending on the difference in downlink signal transmission strength between the indoor and outdoor base stations.

When the base station device 100 of the present disclosure is an outdoor base station, the predetermined value may be defined to be 0. The generation unit 120 of the base station device 100 (the outdoor base station) may generate a base station signal quality value (DL SNR) by subtracting a predetermined value of 0 from an uplink signal quality value (UL SNR) measured by the measurement unit 110. Hence, the base station signal quality value (DL SNR) may be the same as the uplink signal quality value (UL SNR).

According to the first embodiment, the controller 130 may include a base station signal quality value (DL SNR) in an uplink packet received from terminal 2 for transmitting to the network device 200, such that the network device 100 is capable of selecting a downlink base station for terminal 2 on the basis of the base station signal quality value (DL SNR).

For example, instead of the conventional method that includes an uplink signal quality value (UL SNR) measured in association with terminal 2 in the uplink packet received from terminal 2 and transmits the same to the network device 200, the controller 130 may include a base station signal quality value (DL SNR) generated in association with terminal 2 in the uplink packet for transmitting to the network device 200.

Alternatively, in addition to the conventional method that includes an uplink signal quality value (UL SNR) measured in association with terminal 2 in the uplink packet received from terminal 2, the controller 130 may perform control so as further include a base station signal quality value (DL SNR) generated in association with terminal 2 in the uplink packet for transmittal to the network device 200.

According to the first embodiment, a base station that transmits an uplink packet of terminal 2 to the network device 200 may report a base station signal quality value (DL SNR) associated with terminal 2 to the network device 200, irrespective of whether the base station is an indoor base station or an outdoor base station.

Accordingly, the network device 200 may select a downlink base station having the best base station signal quality value (DL SNR) as a downlink base station for terminal 2 among base stations (including indoor or outdoor base stations) that receive the uplink packet of terminal 2 and transmits the same to the network device 200.

According to a second embodiment, the base station device 100 of the present disclosure may be applied only to an indoor base station. The generation unit 120 of the base station device 100 (an indoor base station) may generate a base station signal quality value (DL SNR) by subtracting a predetermined value N from an uplink signal quality value (UL SNR) measured by the measurement unit 110.

According to the second embodiment, the controller 130 may include a base station signal quality value (DL SNR) in an uplink packet that is received from terminal 2 for transmitting to the network device 200.

For example, instead of the conventional method that includes an uplink signal quality value (UL SNR) measured in association with terminal 2 in the uplink packet received from terminal 2 for transmitting to the network device 200, the controller 130 may include a base station signal quality value (DL SNR) in the uplink packet for transmitting to the network device 200.

Alternatively, in addition to the conventional method that includes an uplink signal quality value (UL SNR) measured in association with terminal 2 in the uplink packet received from terminal 2, the controller 130 may further include a base station signal quality value (DL SNR) generated in association with terminal 2 in the uplink packet for transmitting to the network device 200.

According to the second embodiment, an outdoor base station may include an uplink signal quality value (UL SNR) measured in association with terminal 2 in an uplink packet received from terminal 2, and may transmit the same to the network device 200, in the same manner as the conventional method.

According to the second embodiment, the network device 200 may take an uplink signal quality value (UL SNR) as a reference for a base station (an outdoor base station) that does not transmit a base station signal quality value (DL SNR), and may take a base station signal quality value (DL SNR) as a reference for a base station (an indoor base station) that transmits a base station signal quality value (DL SNR). And the network device 200 may select a base station having the best uplink signal quality value (UL SNR) or the best base station signal quality value (DL SNR) among base stations (indoor or outdoor base stations) that receive the uplink packet of terminal 2 for transmitting to the network device 200.

As described above, according to an embodiment of the present disclosure, when the indoor base station measures and reports a channel status (that is, an SNR value) associated with a terminal to a network device, the indoor base station may report a channel status which is a value intentionally adjusted to be lower than that of the outdoor base station because the signal transmission strength of an indoor base station is designed to be lower than that of an outdoor base station.

When selecting a downlink base station for terminal 2, the network device 200 may select a base station having the best channel status, that is, the best SNR value, as a downlink base station for terminal 2, on the basis of the SNR value (DL SNR=UL SNR−0, or UL SNR) of terminal 2 reported from the outdoor base station and the SNR value (DL SNR=UL SNR−N) of terminal 2 which is reported from the indoor base station, and is a value intentionally adjusted to be lower than that of the outdoor base station.

Therefore, according to an embodiment of the present disclosure, the case of selecting a downlink base station with a lower downlink packet reception success rate due to the difference between the uplink signal quality value (UL SNR) and the uplink signal quality value (UL SNR) in the same base station may be avoided.

Figure 3:
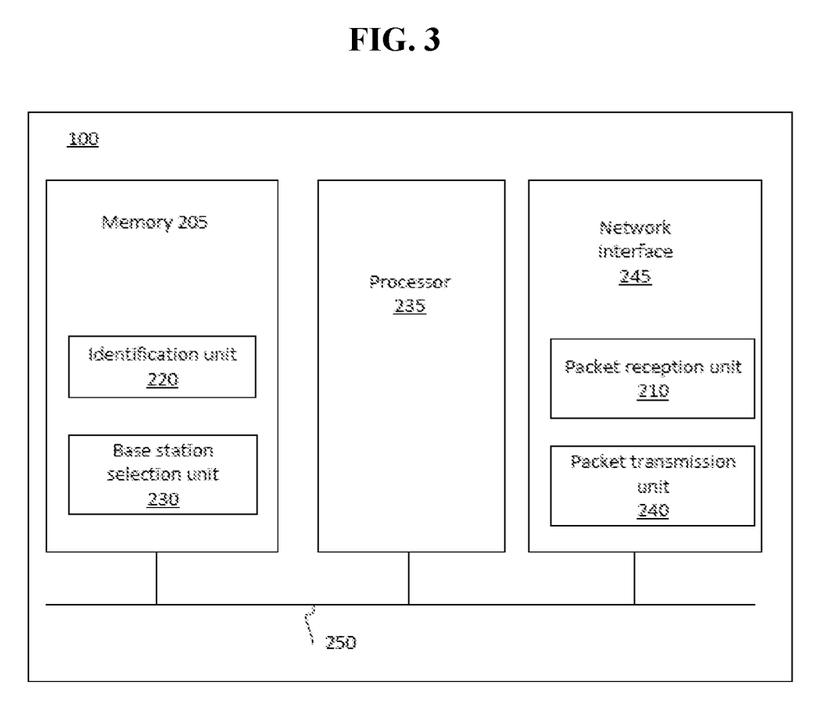
FIG. 3 is a block diagram illustrating the configuration of a network device according to an embodiment of the present disclosure.

Hereinafter, a network device according to an embodiment of the present disclosure will be described with reference to FIG. 3. The network device 200 of the present disclosure may include, among other components, a memory 205, a processor 235, a network interface 245, and a bus 250 connecting these components. The memory 205, the processor 235 and the network interface 245 may be embodied as hardware components such as circuitry or a combination of hardware components and software or firmware. The network interface 245 is a component for performing packet communication, and may include a packet reception unit 210 configured to receive an uplink packet transmitted from the same terminal via two or more base stations and a packet transmission unit 240 of the network device 200 configured to transmit downlink packets to two or more base stations. The memory 205 may include instructions executed by the processor 235. The memory 205 may include, among other software components, an identification unit 220 configured to identify a channel status associated with the terminal for each of the two or more base stations, from two or more uplink packets respectively received from the two or more base stations; and a base station selection unit 230 configured to select a base station having the best channel status associated with the terminal among the two or more base stations, as a downlink base station for the terminal. The identification unit 220 and/or the base station selection unit 230 may be embodied as a dedicated circuit.

In this instance, the channel status is that base station 2 has a downlink signal transmission strength lower than a downlink signal transmission strength of base station 1. The channel status may be a base station signal quality value (DL SNR) which is obtained by base station 2 by applying a predetermined value to an uplink signal quality value of the terminal.

Base station 1 and base station 2 are different types of base stations having different downlink signal transmission strength (transmission output) design. For example, base station 1 may be an outdoor base station and base station 2 may be an indoor base station. Accordingly, hereinafter, for ease of description, base station 1 is referred to as an outdoor base station, and base station 2 is referred to as an indoor base station.

That is, a channel status (i.e., an SNR value) that the identification unit 220 identifies with respect to base station 2 (the indoor base station) may be a base station signal quality value (DL SNR=UL SNR-N) obtained by deducting a predetermined value N from an uplink signal quality value (UL SNR) of a terminal measured by the indoor base station.

Each functional unit of the network device 200 will be described hereinafter in detail. The packet reception unit 210 may receive an uplink packet transmitted by the same terminal via two or more base stations.

For example, when using terminal 2, the packet reception unit 210 may receive the same uplink packet transmitted by the same terminal 2 via two or more base stations, for example, base station 1 and base station 2.

The identification unit 220 may identify a channel status (an SNR value) associated with terminal 2 for each of base station 1 and base station 2, from uplink packets received respectively from the two or more base stations, that is, an uplink packet of terminal 2 received via base station 1 and an uplink packet of terminal 2 received from base station 2.

The channel status (the SNR value) that the identification unit 220 identifies with respect to base station 1 (the outdoor base station) may be an uplink signal quality value (UL SNR) of the terminal measured by the outdoor base station.

Also, the channel status (the SNR value) that the identification unit 220 identifies with respect to base station 2 (the indoor base station) may be a base station signal quality value (DL SNR=UL SNR-N), as described above.

Hereinafter, for ease of description, embodiments are described using base station 1 and base station 2 that transmit an uplink packet of terminal 2 under the assumption that the base station 1 is an outdoor base station and the base station 2 is an indoor base station.

In this instance, according to the above-described first embodiment, base station 1, which is an outdoor base station, may report a base station signal quality value (DL SNR=UL SNR-0) as the SNR value of terminal 2, and base station 2 which is an indoor base station may report a base station signal quality value (DL SNR=UL SNR-N) as the SNR value of terminal 2.

Accordingly, the identification unit 220 may identify the base station signal quality value (DL SNR=UL SNR-0) as the channel status (the SNR value) reported by base station 1, from the uplink packet of terminal 2 received via base station 1, and may identify the base station signal quality value (DL SNR=UL SNR-N) as the channel status (the SNR value) reported via base station 2, from the uplink packet of terminal 2 received via the base station 2.

The base station signal quality value (DL SNR=UL SNR-0) identified in association with base station 1 (the outdoor base station) may be substantially the same as the uplink signal quality value (UL SNR) of the terminal measured by base station 1.

Accordingly, the identification unit 220 may identify the uplink signal quality value (UL SNR) of terminal 2 as the channel status (the SNR value) associated with terminal 2, with respect to the base station 1 (the outdoor base station). The identification unit 220 may also identify the base station signal quality value (DL SNR) of terminal 2 as the channel status (the SNR value) associated with terminal 2, with respect to the base station 2 (the indoor base station).

According to the above-described second embodiment, base station 1 (outdoor base station) may report an uplink signal quality value (UL SNR) as the SNR value of terminal 2, and base station 2 (indoor base station) may report a base station signal quality value (DL SNR=UL SNR-N) as the SNR value of terminal 2.

Accordingly, the identification unit 220 may identify the uplink signal quality value (UL SNR) of terminal 2 as the channel status (the SNR value) associated with terminal 2, with respect to the base station 1 (the outdoor base station), and may identify the base station signal quality value (DL SNR) of terminal 2 as the channel status (the SNR value) associated with terminal 2 (indoor base station) with respect to the base station 2.

The base station selection unit 230 may select base stations having the best channel status (the best SNR value) associated with terminal 2 from two or more base stations, that is, base station 1 and base station 2, as a downlink base station for terminal 2.

Particularly, according to the above-described first embodiment, irrespective of whether a base station is an outdoor base station or an indoor base station, a base station reports a base station signal quality value (DL SNR) associated with terminal 2 to the network device 200, and thus, the base station selecting unit 230 may select a base station having the best base station signal quality value (DL SNR) from base station 1 and base station 2, as a downlink base station for terminal 2.

The base station signal quality value (DL SNR=UL SNR−0) associated with terminal 2 obtained from the base station 1 which is the outdoor base station may be substantially the same as the uplink signal quality value (UL SNR) of terminal 2 measured by base station 1.

According to the second embodiment, the base station selection unit 230 may take an uplink signal quality value (UL SNR) as a reference for the outdoor base station 1 that does not transmit/report a base station signal quality value (DL SNR). The base station selection unit 230 may also take a base station signal quality value (DL SNR) as a reference for the indoor base station 2 that transmits/reports a base station signal quality value (DL SNR). The base station selection unit 230 may select a base station having the best uplink signal quality value (UL SNR) or the best base station signal quality value (DL SNR) from among the base station 1 and the base station 2, as a downlink base station for terminal 2.

Hereinafter, for ease of description, it is assumed that base station 2 is selected as a downlink base station in the above-described first embodiment and second embodiment.

In this instance, when a downlink packet to be transmitted to terminal 2 exists, the packet transmission unit 240 of the network device 200 may transmit the downlink packet to base station 2 which has been selected as a downlink base station for terminal 2.

Accordingly, base station 2 that receives the downlink packet of terminal 2 from the network device 200 may transmit the downlink packet to terminal 2 in a first downlink time interval (DL 1), and terminal 2 may receive the downlink packet transmitted from the network 200 via the base station 2.

As described above, according to an embodiment of the present disclosure, a base station having the best SNR value (that is, the best channel status) is selected as a downlink base station for a terminal on the basis of the SNR value of the terminal reported from an outdoor base station and the SNR value of the terminal which is reported by an indoor base station and is a value intentionally adjusted to be smaller than that of the outdoor base station. Therefore, the case where a decrease in downlink reception success rate due to the difference in downlink signal transmission strength design between base stations may be naturally avoided.

As described above, according to an embodiment of the present disclosure, an improved downlink base station selection scheme may be implemented to take into consideration the differences in downlink signal transmission strength design between base stations when selecting a downlink base station for a terminal. In this way, a downlink packet reception success rate may be increased and the quality of IoT service may be improved.

Figure 4:
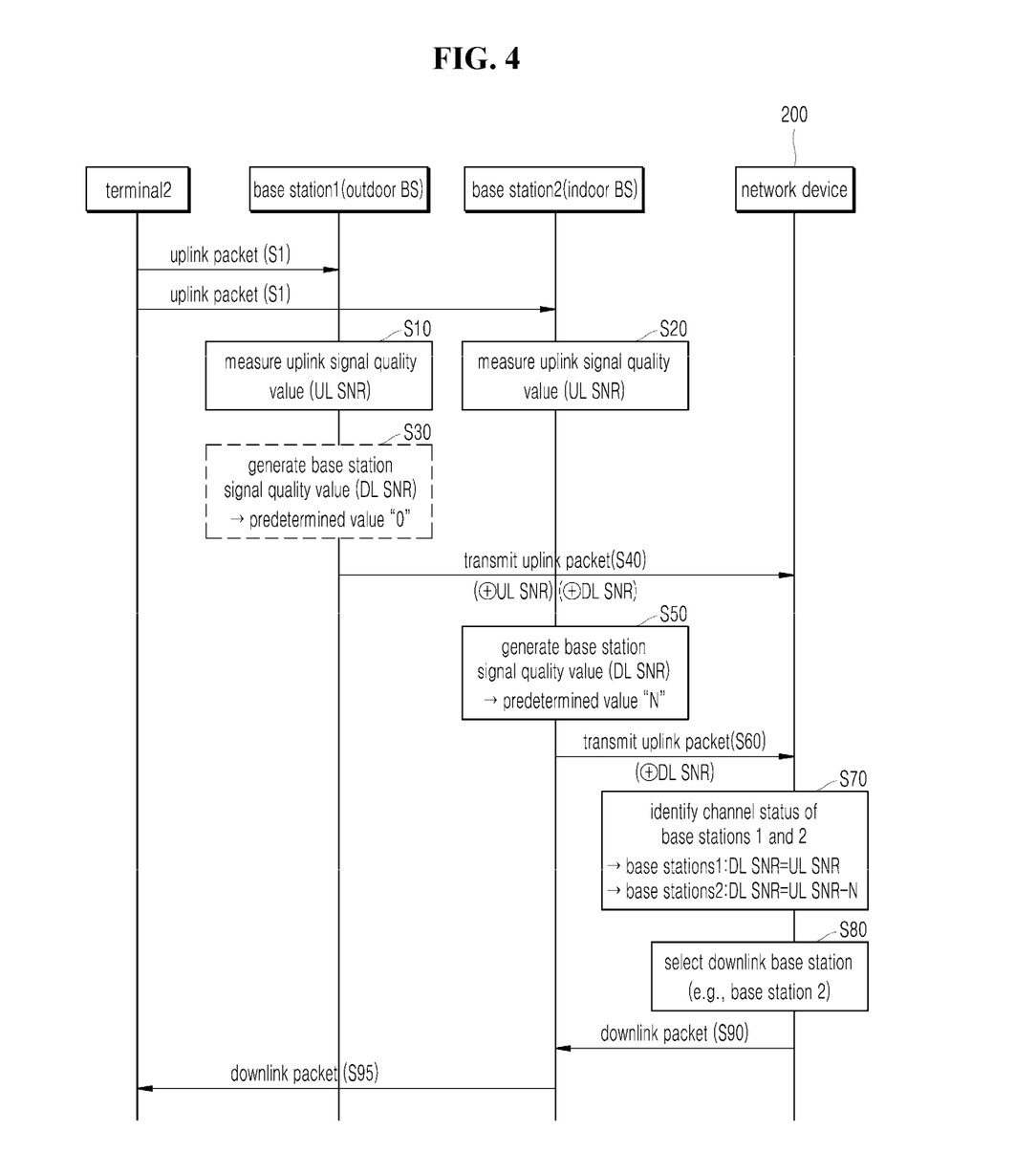
FIG. 4 is a diagram illustrating the situation in which a downlink base station is selected according to an embodiment of the present disclosure.

Hereinafter, referring to FIG. 4, selecting a downlink base station according to an embodiment of the present disclosure will be described. For ease of description, a description will be provided using base station 1 and base station 2 that transmit an uplink packet of terminal 2, on the assumption that the base station 1 is an outdoor base station and the base station 2 is an indoor base station.

When terminal 2 broadcasts an uplink in operation S1, the base stations 1 and 2 that receive the uplink packet of terminal 2 transmit to the network device 200 in operations S40 and S60.

Each of the base stations 1 and 2 transmits and reports a channel status (an SNR value) associated with terminal 2 to the network device 200.

Particularly, in the process in which the base station 1 receives the uplink packet that terminal 2 broadcasts, the base station 1 may measure the quality of an uplink signal (the uplink packet) in operation S10.

According to the first embodiment, the base station 1, which is an outdoor base station, generates a value by subtracting a predetermined value of 0 from the uplink signal quality value (UL SNR) measured in operation S10 to be a base station signal quality value (DL SNR=UL SNR) in operation S30, and may include the base station signal quality value (DL SNR=UL SNR) generated in association with terminal 2 in the uplink packet of terminal 2 for transmittal to the network device 200 in operation S40.

According to the second embodiment, base station 1, which is an outdoor base station, may include the signal quality value (UL SNR) measured in operation S10 in the uplink packet of terminal 2 for transmittal to the network device 200 in operation S40.

Also, in the process in which base station 2 receives the uplink packet that terminal 2 broadcasts, the base station 2 may measure the quality of an uplink signal (the uplink packet) in operation S20.

According to the first and second embodiments, base station 2, which is an indoor base station, generates a value by subtracting a predetermined value N from the uplink signal quality value (UL SNR) measured in operation S20 to be a base station signal quality value (DL SNR=UL SNR−N) in operation S50, and may include the base station signal quality value (DL SNR=UL SNR−N) generated in association with terminal 2 in the uplink packet of terminal 2 for transmittal to the network device 200 in operation S60.

In the process of receiving the uplink packet of terminal 2 from the base station 1 and the base station 2, the network device 200 identifies a channel status (SNR values) associated with terminal 2 for each of the base station 1 and the base station 2 in operation S70.

That is, the network device 200 may identify a base station signal quality value (DL SNR=UL SNR−0) as a channel status (an SNR value) reported by base station 1, and may identify a base station signal quality value (DL SNR=UL SNR−N) as a channel status (an SNR value) reported by base station 2.

In this instance, the base station signal quality value (DL SNR=UL SNR−0) identified with respect to the base station 1 (the outdoor base station) may be substantially the same as the uplink signal quality value (UL SNR) of the terminal measured by base station 1.

The network device 200 may select base stations having the best channel status (the best SNR value) associated with terminal 2 from base station 1 and base station 2, as a downlink base station for terminal 2 in operation S80.

Particularly, according to the above-described first embodiment, irrespective of whether a base station is an outdoor base station or an indoor base station, a base station reports a base station signal quality value (DL SNR) associated with terminal 2 to the network device 200, and thus, the network device 200 may select a base station having the best base station signal quality value (DL SNR) from among base station 1 and base station 2, as a downlink base station for terminal 2.

In this instance, the base station signal quality value (DL SNR=UL SNR−0) associated with terminal 2 obtained from the base station 1 (the outdoor base station) may be substantially the same as the uplink signal quality value (UL SNR) of terminal 2 measured by base station 1.

According to the second embodiment, the network device 200 may take an uplink signal quality value (UL SNR) as a reference for the outdoor base station 1 that does not transmit/report a base station signal quality value (DL SNR) like the conventional method, The network device 200 may take a base station signal quality value (DL SNR) as a reference for the indoor base station 2 that transmits/reports a base station signal quality value (DL SNR), and may select a base station having the best uplink signal quality value (UL SNR) or the best base station signal quality value (DL SNR) from base station 1 and base station 2, as a downlink base station for terminal 2.

Hereinafter, for ease of description, it is assumed that the base station 2 is selected as a downlink base station in the above-described first embodiment and second embodiment. When there is a downlink packet to be transmitted to terminal 2, the network device 200 may transmit the downlink packet to base station 2 selected for terminal 2 in operation S90.

Accordingly, base station 2 that receives the downlink packet of terminal 2 from the network device 200 may transmit the downlink packet to terminal 2 in a first downlink time interval (DL 1) in operation S95, and terminal 2 may receive the downlink packet transmitted from the network 200 via the base station 2.

Figure 5:
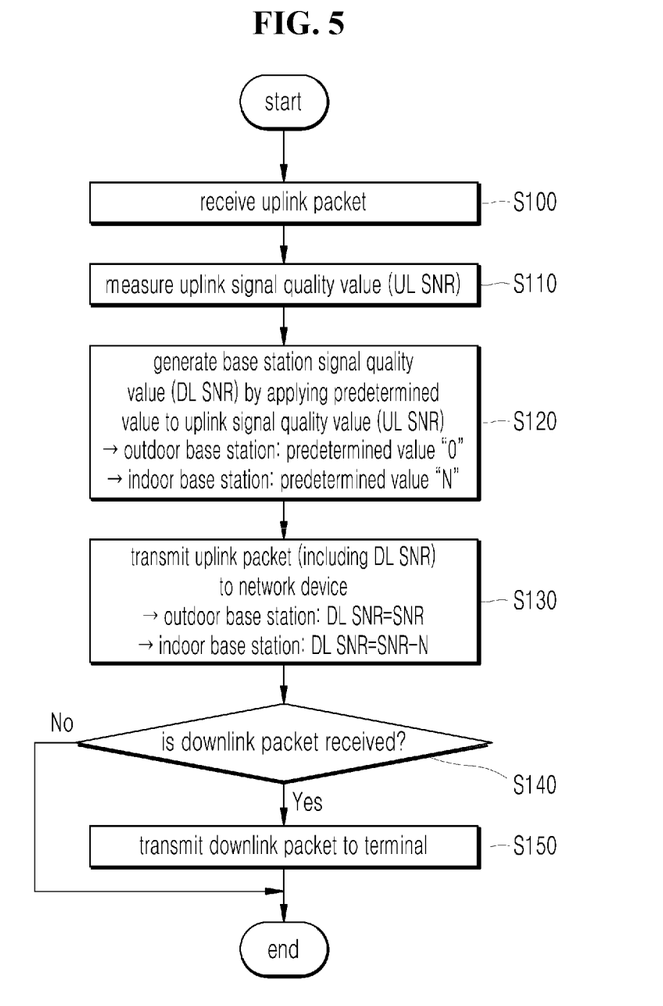
FIG. 5 is a flowchart illustrating the operation method of a base station device according to an embodiment of the present disclosure.

Hereinafter, the operation method of a base station device according to an embodiment of the present disclosure will be described with reference to FIG. 5. For ease of description, it is assumed that an uplink packet is received from terminal 2.

When an uplink packet transmitted from a terminal, for example, terminal 2, is received in operation S100, the operation method of the base station device according to the present disclosure measures the quality of an uplink signal (the uplink packet) in the process of receiving the uplink packet, in operation S110.

The operation method of the base station device according to the present disclosure may involve an uplink signal that is separately transmitted from terminal 2 for signal quality measurement.

Also, the operation method of the base station device according to the present disclosure may apply a predetermined value related to a downlink signal transmission strength of the base station device 100 to the uplink signal quality value (UL SNR) measured in operation S110, to generate a base station signal quality value in operation S120.

The predetermined value is a factor for compensating uplink signal quality values (UL SNR) of IoT base stations by lowering the uplink signal quality value (UL SNR) of an IoT base station that has a downlink signal transmission strength lower than the uplink signal quality value (UL SNR) of an IoT base station that has a high downlink signal transmission strength based on the downlink signal transmission strength of the IoT base stations coexisting in an IoT network.

According to a detailed embodiment, the operation method of the base station device according to the present disclosure includes generating a value by subtracting a predetermined value from the uplink signal quality value (UL SNR) measured in operation S110, as the base station signal quality value (DL SNR).

For example, when the base station device is an indoor base station, the operation method of the base station device according to the present disclosure may generate a value by subtracting a predetermined value N from the measured uplink signal quality value (UL SNR) to be the base station signal quality value (DL SNR=UL SNR−N).

Conversely, when the base station device is an outdoor base station, the operation method of the base station device according to the present disclosure may generate a value by subtracting a predetermined value of 0 from the measured uplink signal quality value (UL SNR) to be the base station signal quality value (DL SNR=UL SNR).

Accordingly, when transmitting the uplink packet of terminal 2 received in operation S100 to the network device 200, the operation method of the base station device according to the present disclosure may transmit the base station signal quality value (DL SNR) generated in association with terminal 2 to the network device 200 in operation S130.

Accordingly, the network device 200 may select a downlink base station having the best base station signal quality value (DL SNR) among base stations (indoor or outdoor base stations) that receive the uplink packet of terminal 2 and transmit the uplink packet to the network device 200, as a downlink base station for terminal 2.

When a downlink packet for terminal 2 is received in operation S140 (YES), the operation method of the base station device according to the present disclosure may transmit the downlink packet to terminal 2 in a first downlink time interval (DL1) in operation S150, such that terminal 2 may receive the downlink packet transmitted from the network 200 via base station 2.

As described above, according to embodiments of the present disclosure, an improved downlink base station selection scheme may be implemented that takes into consideration the difference in designed downlink signal transmission strength between base stations when selecting a downlink base station for a terminal. In this way, a downlink packet reception success rate may be increased and the quality of IoT service may be improved.

The operation method of the base station device according to an embodiment of the present disclosure may be implemented in the form of program commands executable via various computer means, and may be recorded in a computer readable medium. The computer readable medium may include a program command, a data file, a data structure, and the like independently or in combination. The program command recorded in the medium may be things specially designed and configured for the present disclosure, or things that are well known to and can be used by those skilled in the computer software related art. Examples of the computer-readable recording medium include magnetic media such as hard disks, floppy disks and magnetic tapes, optical media such as a Compact Disc Read-Only Memory (CD-ROM) and a Digital Versatile Disc (DVD), magneto-optical media such as floppy disks, and hardware devices such as a Read-Only Memory (ROM), a Random Access Memory (RAM) and a flash memory, which are specially configured to store and perform program instructions. Examples of the program command include a machine language code generated by a compiler and a high-level language code executable by a computer through an interpreter and the like. The hardware device may be configured to operate as one or more software modules in order to perform operations of the present disclosure, and vice versa.

Although the present disclosure has been described in detail with reference to exemplary embodiments, the present disclosure is not limited thereto and it is apparent to those skilled in the art that various modifications and changes can be made thereto without departing from the scope of the present disclosure.

What is claimed is:

1. A base station comprising:
a processor; and
a memory storing instructions thereon, the instructions when executed by a processor cause the processor to:
measure quality of an uplink signal received by the base station from a terminal;
generate a base station signal quality value by adjusting the measured uplink signal quality value according to a predetermined value indicating a downlink signal transmission strength of the base station; and
include the base station signal quality value in an uplink packet from the terminal for transmitting to a network device to cause the network device to select a downlink base station for the terminal among a plurality of base stations based at least on the base station signal quality value.

2. The base station of claim 1, wherein the base station signal quality value of the base station is lower than another base station signal quality value of another base station with the same uplink signal quality value, the other base station having another downlink signal transmission strength higher than the base station.

3. The base station of claim 1, wherein the instructions further casue the processor to generate the base station signal quality value by subtracting the predetermined value from the uplink signal quality value.

4. The base station of claim 3, wherein the predetermined value is higher than another predetermined value of another base station having a downlink signal transmission strength higher than the base station.

5. The base station of claim 3, wherein the predetermined value is a fixed value if the base station is an indoor base station, and the predetermined value is zero if the base station is an outdoor base station device having a downlink signal transmission strength higher than the indoor base station.

6. The base station of claim 1, wherein the terminal broadcasts the uplink packet to a plurality of base stations including the base station for sending but receive downlink packets from the network device via the selected downlink base station.

7. The base station of claim 6, wherein the terminal does not receive the downlink packets during an uplink transmission interval.

8. A method of operating a base station between a terminal and a network device, the method comprising:
measuring, by the base station, quality of an uplink signal received from a terminal for sending to the network device;
generating a base station signal quality value of the base station by adjusting the measured uplink signal quality value by a predetermined value indicating a downlink signal transmission strength of the base station; and
including the base station signal quality value in an uplink packet from the terminal for transmitting from the base station to the network device to cause the network device to select a downlink base station for the terminal among a plurality of base stations based at least on the base station signal quality value.

9. The method of claim 8, wherein the base station signal quality value of the base station is lower than another base station signal quality value of another base station with the same uplink signal value, the other base station having another downlink signal transmission strength higher than the base station.

10. The method of claim 8, wherein the generating comprises:
generating the base station signal quality value by subtracting the predetermined value from the uplink signal quality value.

11. The method of claim 10, wherein the predetermined value is higher than another predetermined value of another base station having another downlink signal transmission strength higher than the base station.

12. The method of claim 10, wherein the predetermined value is a fixed value if the base station is an indoor base station, and the predetermined value is zero if the base station is an outdoor base station having a downlink signal transmission strength higher than the indoor base station.

13. The method of claim 8, wherein the terminal broadcasts the uplink packet to a plurality of base stations including the base station for sending but receive downlink packets from the network device via the selected downlink base station.

14. The method of claim 8, wherein the terminal does not receive the downlink packets during an uplink transmission interval.

15. A network device, comprising:
a network interface circuit configured to receive an uplink packet transmitted by a terminal via base stations;
a processor; and
a memory storing instructions thereon, the instructions when executed by the processor cause the processor to:
extract base station signal quality values from uplink packets received from the base stations, the base station signal quality value of a base station generated by adjusting a uplink signal quality value measured at the base station according to a predetermined value indicating a downlink signal transmission strength of the base station; and
select one of the base stations having a highest base station signal quality value as a downlink base station for the terminal.

16. The network device of claim 15, wherein a first base station signal quality value of a first base station is lower than a second base station signal quality value of a second base station with a same uplink signal quality value, the second base station having another downlink signal transmission strength higher than the base station.

17. The network device of claim 15, wherein a difference between a first predetermined value for a first base station and a second predetermined value of a second base station is increased as a difference in a first downlink signal transmission strength of the first base station and a second downlink signal transmission strength of the second base station is increased.

18. The network device of claim 15, wherein the base station selection unit is further configured to select, as the downlink base station for the terminal, a base station with a base station signal quality value extracted first among two or more base stations having the same highest base station signal quality value.

19. The network device of claim 15, wherein the terminal broadcasts the uplink packet to a plurality of base stations including the base station for sending but receive downlink packets from the network device via the selected downlink base station.

20. The network device of claim 19, wherein the terminal does not receive the downlink packets during an uplink transmission interval.

* * * * *